(12) United States Patent
LaMarca et al.

(10) Patent No.: US 6,266,670 B1
(45) Date of Patent: Jul. 24, 2001

(54) USER LEVEL ACCESSING OF LOW-LEVEL COMPUTER SYSTEM OPERATIONS.

(75) Inventors: Anthony G. LaMarca, Redwood City; James P. Dourish; Warren K. Edwards, both of San Fransisco; John O. Lamping, Los Altos; Karin Petersen, Palo Alto; Michael P. Salisbury, Mountain View; Douglas B. Terry, San Carlos; James D. Thornton, Redwood City, all of CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/143,802

(22) Filed: Aug. 31, 1998

(51) Int. Cl.$^7$ .................................................. G06F 17/100
(52) U.S. Cl. ......................... 707/100; 707/103; 707/514; 707/204
(58) Field of Search ................................... 707/2, 3, 103, 707/163, 500, 511, 514, 515, 529, 530, 203, 100; 710/128

(56) References Cited

U.S. PATENT DOCUMENTS

| | | | |
|---|---|---|---|
| 5,546,534 | * 8/1996 | Malcolm | 714/6 |
| 5,584,023 | * 12/1996 | Hsu | 395/620 |
| 5,729,733 | * 3/1998 | Sharif-Askary | 395/608 |
| 5,765,176 | * 6/1998 | Bloomberg | 707/514 |
| 5,802,365 | * 9/1998 | Kathail et al. | 395/681 |
| 5,806,068 | * 9/1998 | Shaw et al. | 707/103 |
| 5,812,773 | * 9/1998 | Norin | 395/200 |
| 5,895,477 | * 4/1999 | Orr et al. | 707/517 |
| 5,913,032 | * 6/1999 | Schwartz et al. | 395/200 |
| 5,999,664 | * 12/1999 | Mahoney et al. | 382/305 |
| 6,016,492 | * 1/2000 | Saxton et al. | 707/100 |
| 6,031,989 | * 2/2000 | Cordell | 395/701 |

OTHER PUBLICATIONS

Interposition agents: Transparently interposing user code at the system interface, Michael B. Jones, (Microsoft Research, Microsoft Corp.)

SLIC: An extensibility system for commodity operating systems, Ghormley et al., (Computer Science Division, Univ. of CA at Berkley).

Finding and Reminding: File organization from the desktop, Barreau et al., (Sigchi, vol. 27, No. 3, Jul. 1995).

Finding and Reminding, Reconsidered, Fertig et al., (Sigchi, vol. 28, No. 1, Jan. 1996).

Information Visualisation Using 3D Interactive Animation, Robertson et al., (Communications of the ACM, vol. 36, No. 4, Apr. 1993).

Using a Landscape Metaphor to Represent a Corpus of Documents, Matthew Chalmers, (Rank Xerox EuroPARC, in Proc. European Conf. on Spatial Information Theory, Elba, Sep. 1993).

(List continued on next page.)

Primary Examiner—Hosain T. Alam
Assistant Examiner—Anh Ly
(74) Attorney, Agent, or Firm—Fay, Sharpe, Fagan, Minnich & McKee, LLP

(57) ABSTRACT

A mechanism is provided which allows a user to enhance the functionalities of system operations in a computer system that were traditionally encapsulated within the computer system, and outside the control of the user. The user is provided with the ability to build arbitrary, extensible behaviors and to have those behaviors executed on low level computer system processes after the user issues an operation request through a known input device. The mechanism may be implemented as properties which are integrated on a content and/or property read write path of the computer system.

20 Claims, 4 Drawing Sheets

OTHER PUBLICATIONS

Lifestreams: Organizing Your Electronic Life, Freeman et al., (Yale University, Dept of Computer Science).

Semantic File Systems, Gifford et al., (Programming Systems Research Group, 1991 ACM 0–89791–447–3/91/0009/0016).

The Digitial Library Integrated Task Enironment (DLITE), Cousins et al., (Stanford University / Xerox PARC).

A Pile Metaphor for Supporting Casual Organization of Information, Mander et al., (Chi. '92, 1992 ACM 0–89791–513–5/92/0005–0627).

Representing Information About Files, Jeffrey Mogul, (Computer Science Dept., Stanford, University, CH2021–4/84/000/0432$01.00 1984 IEEE).

* cited by examiner

USER LEVEL ACCESSING OF LOW-LEVEL COMPUTER SYSTEM OPERATIONS.

The following applications are related to the present application:

U.S. Ser. No. 09/143,551, Karin Petersen, et al., entitled PROPERTY-BASED USER LEVEL DOCUMENT MANAGEMENT; U.S. Ser. No. 09/143,778, Douglas B. Terry, et al., entitled A PROPERTY-BASED MECHANISM FOR FLEXIBLY SUPPORTING FRONT-END AND BACK-END COMPONENTS HAVING DIFFERENT COMMUNICATION PROTOCOLS; U.S. Ser. No. 09/144,143, Warren K. Edwards, et al., entitled ATOMIC AND MOLECULAR DOCUMENTS; U.S. Ser. No. 09/143,555, Michael P. Salisbury, et al, entitled VIRTUAL DOCUMENTS; U.S. Ser. No. 09/144,383, John O. Lamping, et al, entitled SELF CONTAINED DOCUMENT MANAGEMENT BASED ON DOCUMENT PROPERTIES; U.S. Ser. No. 09/143,773, James D. Thornton, et al., entitled SERVICE INTERACTION USING PROPERTIES ATTACHED TO DOCUMENTS; U.S. Ser. No. 09/144,231, James P. Dourish, et al., entitled ACTIVE PROPERTIES FOR DYNAMIC SYSTEM CONFIGURATION; U.S. Ser. No. 09/143,777, Warren K. Edwards, et al., entitled EXTENDING APPLICATION BEHAVIOR THROUGH DOCUMENT PROPERTIES; U.S. Ser. No. 09/143,772, Michael P. Salisbury, et al., entitled MAINTAINING DOCUMENT IDENTITY ACROSS FILE SYSTEM INTERFACES; U.S. Ser. No. 09/144,032, Anthony G. LaMarca, et al, entitled CLUSTERING RELATED FILES IN A DOCUMENT MANAGEMENT SYSTEM.

Each of the above applications filed Aug. 31, 1998 and commonly assigned are hereby incorporated by reference.

BACKGROUND OF THE INVENTION

The present invention pertains to the art of document management and more particularly to a mechanism and method which allows a user to build arbitrarily extensible behaviors and to have those behaviors executed on low level, previously encapsulated, computer system processes.

This mechanism can be implemented as properties attached to documents. Properties are user and document specific in the sense that they are associated with the user which attached the properties and are directed to control of specific documents. This structure allows for the separation of the location of the document content from the document's management, which is described by its properties. Implementation of the properties eliminates the need to adhere to traditional file system and folder hierarchies, where the storage and retrieval of documents are based on a storage location. The present invention simplifies the manner in which people access, share, and manage documents and collections of documents by raising the level of abstraction away from low-level concepts such as disc drives, file servers, and directory names towards higher level and more human oriented concepts. A user associates high-level properties with documents while leaving the specific decisions of how best to provide these properties to the document management system of the present invention.

The inventors have recognized that a large amount of a user's interaction with a computer has to do with document management, such as storing, filing, organizing and retrieving information from a variety of electronic documents. These documents may be found on a local disc, on a network system file server, an e-mail file server, the World Wide Web, or a variety of other locations. Modern communication delivery systems have had the effect of greatly increasing the flow of documents which may be incorporated within a user's document space, thereby increasing the need for better tools to visualize and interact with the accumulated documents. The most common tools for organizing a document space rely on a single fundamental mechanism known as hierarchical storage systems, wherein documents are treated as files that exist in directories or folders, which are themselves contained in other directories, thereby creating a hierarchy that provides the structure for document space interactions. Each directory in a hierarchy of directories, will commonly contain a number of individual files. Typically, files and directories are given alpha-numeric, mnemonic names in large storage volumes shared via a network. In such a network, individual users may be assigned specific directories.

A file located in a sub-directory is located by its compound path name. For example, the character string D:\TREE\LIMB\BRANCH\TWIG\LEAF.FIL could describe the location of a file LEAF.FIL whose immediate directory is TWIG and which is located deep in a hierarchy of files on the drive identified by the letter D. Each directory is itself a file containing file name, size, location data, and date and time of file creation or changes.

Navigation through a file system, to a large degree, can be considered as navigation through semantic structures that have been mapped onto the file hierarchy. Such navigation is normally accomplished by the use of browsers and dialog boxes. Thus, when a user traverses through the file system to obtain a file (LEAF.FIL), this movement can be seen not only as a movement from one file or folder to another, but also as a search procedure that exploits features of the documents to progressively focus on a smaller and smaller set of potential documents. The structure of the search is mapped onto the hierarchy provided by the file system, since the hierarchy is essentially the only existing mechanism available to organize files. However, documents and files are not the same thing.

Since files are grouped by directories, associating a single document with several different content groupings is cumbersome. The directory hierarchy is also used to control the access to documents, with access controls placed at every node of the hierarchy, which makes it difficult to grant file access to only one or a few people. In the present invention, separation of a document's inherent identity from its properties, including its membership in various document collections, alleviates these problems.

Other drawbacks include that existing hierarchical file systems provide a "single inheritance" structure. Specifically, files can only be in one place at a time, and so can occupy only one spot in the semantic structure. The use of links and aliases are attempts to improve upon such a limitation.

Thus, while a user's conception of a structure by which files should be organized may change over time, the hierarchy described above is fixed and rigid. While moving individual files within such a structure is a fairly straightforward task, reorganizing large sets of files is much more complicated, inefficient and time consuming. From the foregoing it can be seen that existing systems do not address a user's need to alter a file structure based on categories which change over time. At one moment a user may wish to organize the document space in terms of projects, while at some time in the future the user may wish to generate an organization according to time and/or according to document content. A strict hierarchical structure does not allow management of documents for multiple views in a seamless manner resulting in a decrease in the efficiency of document retrieval.

Existing file systems also support only a single model for storage and retrieval of documents. This means a document is retrieved in accordance with a structure or concepts given to it by its author. On the other hand, a user who is not the author may wish to retrieve a document in accordance with a concept or grouping different from how the document was stored.

Further, since document management takes place on a device having computational power, there would be benefits to harnessing the computational power to assist in the organization of the documents. For example, by attaching a spell-checker property to a document, it can extend the read operation of a document so that the content returned to the requesting application will be correctly spelled. The inventors are aware that others have studied the area of document management/storage systems.

DMA is a proposed standard from AIIM designed to allow document management systems from different vendors to interoperate. The DMA standard covers both client and server interfaces and supports useful functionality including collections, versioning, renditions, and multiple-repository search. A look at the APIs show that DMA objects (documents) can have properties attached to them. The properties are strongly typed in DMA and must be chosen from a limited set (string, int, date . . . ). To allow for rich kinds of properties, one of the allowable property types is another DMA object. A list type is allowed to build up big properties. Properties have a unique IDs in DMA. Among the differences which exist to the present invention, is the properties are attached to documents without differentiation about which user would like to see them; properties are stored in the document repository that provides the DMA interface, not independently from it. Similarly, DMA does not provide support for active properties.

WebDAV is another interface designed to allow an extended uniform set of functionality to be attached with documents available through a web server. WebDAV is a set of extensions to the HTTP 1.1 protocol that allow Web clients to create and edit documents over the Web. It also defines collections and a mechanism for associating arbitrary properties with resources. WebDAV also provides a means for creating typed links between any two documents, regardless of media type where previously, only HTML documents could contain links. Compared to the present invention, although WebDAV provides support for collections, these are defined by extension (that is all components have to be explicitly defined); and although it provides arbitrary document properties, these live with the document itself and cannot be independently defined for different users, furthermore there is no support for active properties and are mostly geared toward having ASCII (or XML) values.

DocuShare is a simple document management system built as a web-server by Xerox Corporation. It supports simple collections of documents, limited sets of properties on documents and support for a few non-traditional document types like calendars and bulletin boards. It is primarily geared toward sharing of documents of small, self-defined groups (for the latter, it has support to dynamically create users and their permissions.) DocuShare has notions of content providers, but these are not exchangeable for a document. Content providers are associated with the type of the document being accessed. In DocuShare properties are static, and the list of properties that can be associated with a document depends on the document type. Users cannot easily extend this list. System administrators must configure the site to extend the list of default properties associated with document types, which is another contrast to the present invention. Also, in DocuShare properties can be visible to anyone who has read access for the collection in which the document is in. Properties are tightly bound to documents and it is generally difficult to maintain a personalized set of properties for a document, again a different approach than the one described in the present invention.

An operating system "SPIN" from the University of Washington allows users to inject code into the kernel that is invoked when an appropriate system call or system state occurs (For example, users can inject code that alters paging decisions.). Their technology could be used to make it possible to inject code into the file system to invoke a user's code on read and write. Among the differences between SPIN and the concepts of present invention are that code injected into SPIN runs at the kernel level and users can only express their behaviors in a restricted, safe language in which it is not possible to do "bad things." As such, expressiveness is limited. On the other hand, the properties in the present invention run at the user level, and can have GUIs call out to third party libraries and in general be far more expressive than a kernel injected spindle. Further, the properties of the present invention are expressed in terms of documents, as in "I attach property X to Document Y." The SPIN system, on the other hand, extends a system call such as "read" on all files. The example document specific behaviors mentioned above are more easily mapped into a system such as the present invention in which properties are explicitly attached to individual documents.

Other work which allows operating system calls to be extended into user's code include, the article "Interposition Agents: Transparently Interposing User Code and System Interface," by Michael B. Jones in Proceedings of the 14th Symposium on Operating Systems, Principles, Asheville, N.C., December, 1993, pages 80–93. The article "SLIC: An Extensibility System for Commodity Operating Systems," by Douglas P. Ghormley, Steven H. Rodriguez, David Petrou, Thomas E. Anderson, USENIX 1998 Annual Technical Conference, New Orleans, La., June 1998.

Further, Windows NT (from Microsoft) has a function called "Filter Drivers" which, once installed, can see the accesses made to a file system. Like SPIN, a filter driver is invoked on operations on all files instead of on a document by document basis. Furthermore, installing filter drivers is a privileged operation, not available to normal users. As such, a user level mechanism, such as the document properties of the present invention and event dispatching architecture would be needed to allow users to express their desired behaviors.

There are also systems which, in a very specific domain, allow users to apply behaviors when documents are accessed. An example is the Tandem e-mail system, which has a "screen cobol" language and has hooks to find out when events occur. This system allows users to code filters to do custom operations when documents arrive and/or read. One of the differences between this system and the present invention, is that the Tandem system solves the problem in a specific domain and invokes only the user's behaviors when the documents are accessed via the mail application. In the present invention, the behaviors are invoked regardless of the application and regardless of the interface.

SUMMARY OF THE INVENTION

The present invention provides a method and apparatus to allow a user to enhance functionalities of system operations of a computer system that are traditionally encapsulated within lower level processes of the computer system, and which were previously outside the control of the user. The user is provided with a mechanism which intercepts operation requests and performs user determined actions based on those requests. The interception of the operation requests occurs after issuance of the operation requests by the user. In this manner the user is provided with an ability to effect computer system functionalities not previously available.

A more limited aspect of the present invention includes intercepting low level operations performed by storage systems of the computer system.

Such low level operations include intercepting file system access operations, read operations, write operations, and copy, move and close operations.

With attention to yet another aspect of the present invention, the user can build arbitrary, extensible behaviors which can be used to perform the user determined actions.

Turning attention to yet another aspect of the present invention, the arbitrary extensible behaviors are implemented as properties which are attached to documents by a user of the system.

With attention to yet another aspect of the present invention, operations of the computer system are fixed upon configuration of the computer system, whereas properties can be added to the computer system by a user after the computer system has been configured.

A principal advantage of the present invention is that it provides the user with the capability of affecting low level processes of the computer system, which prior to this invention were not accessible by a user in an easy and efficient manner, nor were these available to a user of the system without a detailed knowledge of the operating characteristics of the system at this low level.

Still other advantages and benefits will become apparent to those skilled in the art upon a reading and understanding of the following detailed description.

DESCRIPTION OF THE DRAWINGS

The invention may take physical form in certain parts and arrangement of parts, a preferred embodiment of which will be described in detail in this specification and illustrated in the accompanying drawings which form a part hereof, and wherein.

DETAILED DESCRIPTION OF THE PREFERRED EMBODIMENTS

Prior to discussing the present invention in greater detail, it is believed a glossary of terms used in the description would be beneficial. Therefore, the following definitions are set forth:

Action: The behavior part of a property.

Active Property: A property in which code allows the use of computational power to either alter the document or effect another change within the document management system.

Arbitrary: Ability to provide any property onto a document.

Base Document: Corresponds to the essential bits of a document. There is only one Base Document per document. It is responsible for determining a document's content and may contain properties of the document, and it is part of every principal's view of the document.

Base Properties: Inherent document properties that are associated with a Base Document.

Bit Provider: A special property of the base document. It provides the content for the document by offering read and write operations. It can also offer additional operations such as fetching various versions of the document, or the encrypted version of the content.

Browser: A user interface which allows a user to locate and organize documents.

Collection: A type of document that contains other documents as its content.

Combined Document: A document which includes members of a collection and content.

Content: This is the core information contained within a document, such as the words in a letter, or the body of an e-mail message.

Content Document: A document which has content.

Distributed: Capability of the system to control storage of documents in different systems (i.e., file systems, www, e-mail servers, etc.) in a manner invisible to a user. The system allows for documents located in multi-repositories to be provided to a principal without requiring the principal to have knowledge as to where any of the document's content is stored.

DMS: Document Management System

Document: This refers to a particular content and to any properties attached to the content. The content referred to may be a direct referral or an indirect referral. The smallest element of the DMS. There are four types of documents; Collection, Content Document, No-Content Document and Combined Document.

Document Handle: Corresponds to a particular view on a document, either the universal view, or that of one principal.

Document ID: A unique identifier for each Base Document. A Reference Document inherits the Document ID from its referent. Document identity is thus established via the connections between Reference Document and Base Document. Logically, a single document is a Base Document and any Reference Document that refer to it.

Kernel: Manages all operations on a document. A principal may have more than one kernel.

Multi-Principal: Ability for multiple principals to have their own set of properties on a Base Document wherein the properties of each principal may be different.

Notification: Allows properties and external devices to find out about operations and events that occur in DMS.

No Content Document: A document which contains only properties.

Off-the-Shelf Applications: Existing applications that use protocols and document storage mechanisms provided by currently existing operating systems.

Principal: A "User" of the document management system. Each person or thing that uses the document management system is a principal. A group of people can also be a principal. Principals are central because each property on a document can be associated with a principal. This allows different principals to have different perspectives on the same document.

Property: Some bit of information or behavior that can be attached to content. Adding properties to content does not change the content's identity. Properties are tags that can be placed on documents, each property has a name and a value (and optionally a set of methods that can be invoked).

Property Generator: Special case application to extract properties from the content of a document.

Reference Document: Corresponds to one principal's view of a document. It contains a reference to a Base Document (Reference Document A refers to Base Document B) and generally also contains additional properties. Properties added by a Reference Document belong only to that reference; for another principal to see these properties, it must explicitly request them. Thus, the view seen by a principal through his Reference Document is the document's content (through the Base Document), and a set of properties (th in the reference and on the Base Document). Even an owner of a Base Document can also have a Reference Document to that base, in which he places personal properties of the document that should not be considered an essential part of the document and placed in all other principal's view.

Space: The set of documents (base or references) owned by a principal.

Static Property: A name-value pair associated with the document. Unlike active properties, static properties have no behavior. Provides searchable meta-data information about a document.

A concept of the present invention is directed to a user centric mechanism which allows a user to become involved with low level computer system processes.

Figure 1:
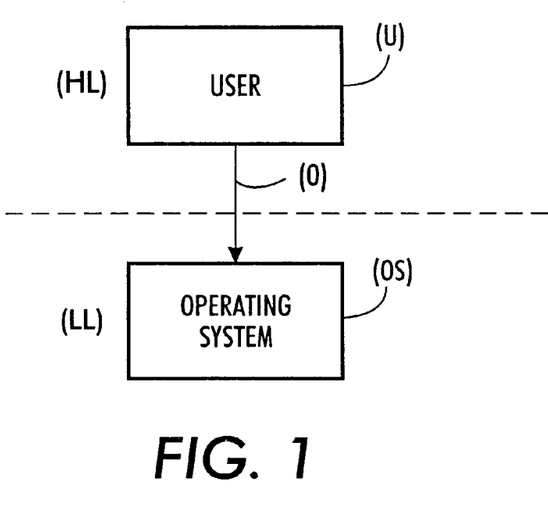
FIG. 1 illustrates a computer system where a high level operator requests a low level process.

FIG. 1 illustrates an existing computer system, where user (U), at a 40 high-level (HL) of the computer system, issues an operation request (O)requiring a low level process such as a file read, file write or other well-known low level function. The operation request is delivered into a low-level (LL) of the computer system and to operating system (OS), where the operation request (O) is undertaken and completed. In existing computer systems once the operation request (O) is initiated, the user has no capability of interjecting himself/herself into the process. Particularly, the functions occurring in this low level (LL) after initiation of the operation request (O) are encapsulated processes not normally accessible to the user.

Figure 2:
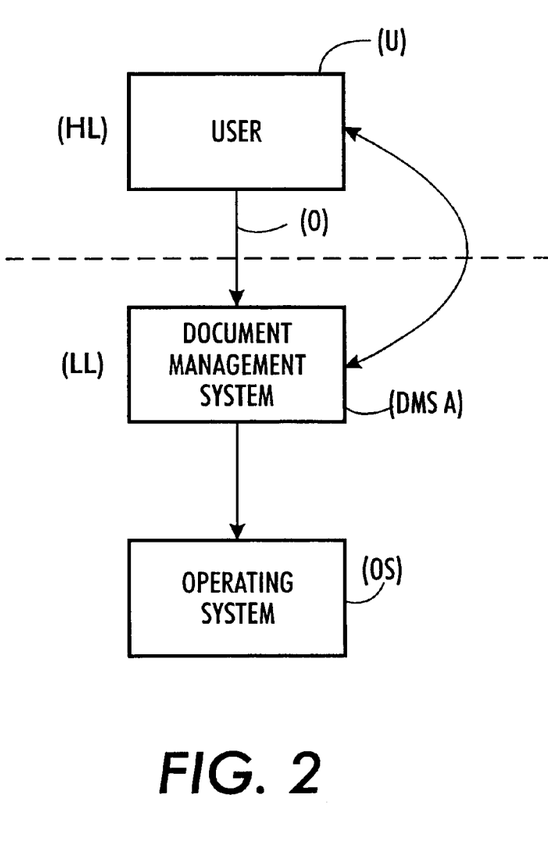
FIG. 2 depicts a concept of the present invention, where a mechanism is provided to a user to affect change on low level processes.

The present invention implements a user centric mechanism that allows the user to effect change to these low level processes. For example, as shown in FIG. 2, interposed between user (U), at the high level (HL), and operating system (OS), at the low level (LL), is a document management system (DMS A) configured in accordance with the teachings of the present invention. As depicted in this figure, DMS A provides a path (P) which represents the user's ability to effect change within low-level (LL) processes.

The user can also add arbitrarily extensible behaviors to documents of the computer system, which affect the previously encapsulated low level computer system processes not previously available to user. This allows the user to enhance the functionality of traditionally very low level processes in a simple high level manner using high level commands (such as send Joe e-mail each time Document A accessed). A user does not need to have knowledge regarding the specific functions of the computer system, and does not need to understand the low level processes of a computer system to use the present invention. One manner of implementing the mechanism described above, is through the use of properties which may be attached to documents of the document management system.

As discussed in the background of the invention, the structure that file systems provide for managing files becomes the structure by which users organize and interact with documents. However, documents and files are not the same thing. The present invention provides for the separate management of properties related to the document or concerning the document from the management of the document content. Therefore, user-specific document properties are managed close to the document consumer or user of the document rather than where the document is stored. Separation of the management of user properties from the document content itself provides the ability to move control of document management from a closed file system concept to a user-based methodology.

Figure 3:
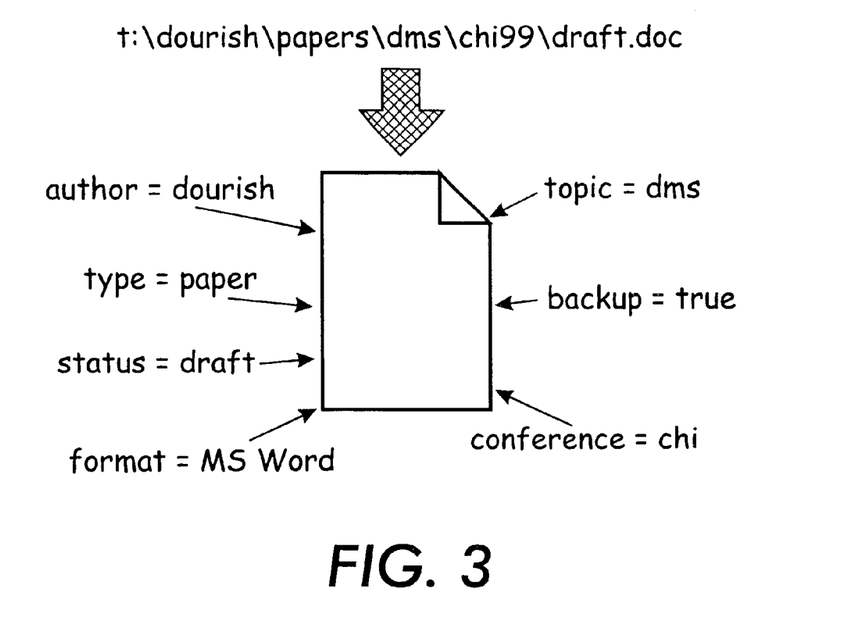
FIG. 3 shows a hierarchical storage mechanism compared to the concept of properties of the present invention.

FIG. 3 illustrates a distinction between hierarchical storage systems whose documents are organized in accordance with their location described by a hierarchical structure and the present invention where documents are organized according to their properties (e.g. author=dourish, type=paper, status=draft, etc.). This means documents will retain properties even when moved from one location to another, and that property assignment can have a fine granularity.

Figure 4:
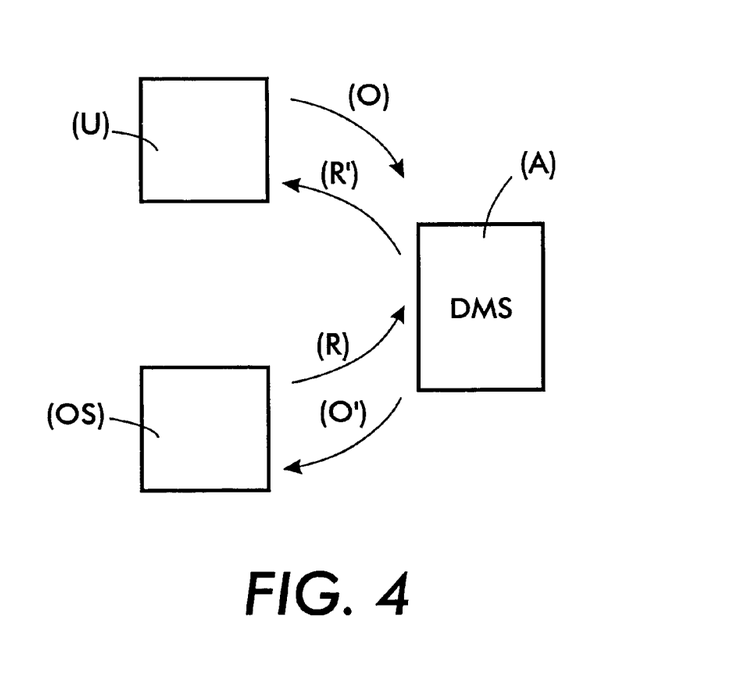
FIG. 4 is a block diagram of a document management system according to the present invention, interposed within a communication channel between a user and an operating system.

To integrate properties within the document management system of the present invention, the properties are presented within the content and/or property read/write path of a computer system, with the ability to both change the results of an operation as well as take other actions. The outline of the concept is described in FIG. 4, where once user (U) issues an operation request (O), prior to that operation being performed by operating system (OS), a call is made to document management system (DMS) A of the present invention, which allows DMS A to function so as to achieve the intended concepts of the present invention. This includes having DMS A interact with operating system (OS), through its own operation request (O'). Once operation request (O') is completed, the results are returned (R) to DMS A which in turn presents results (R') to user (U).

With these basic concepts having been presented, a more detailed discussion of the invention is set forth below.

Figure 5:
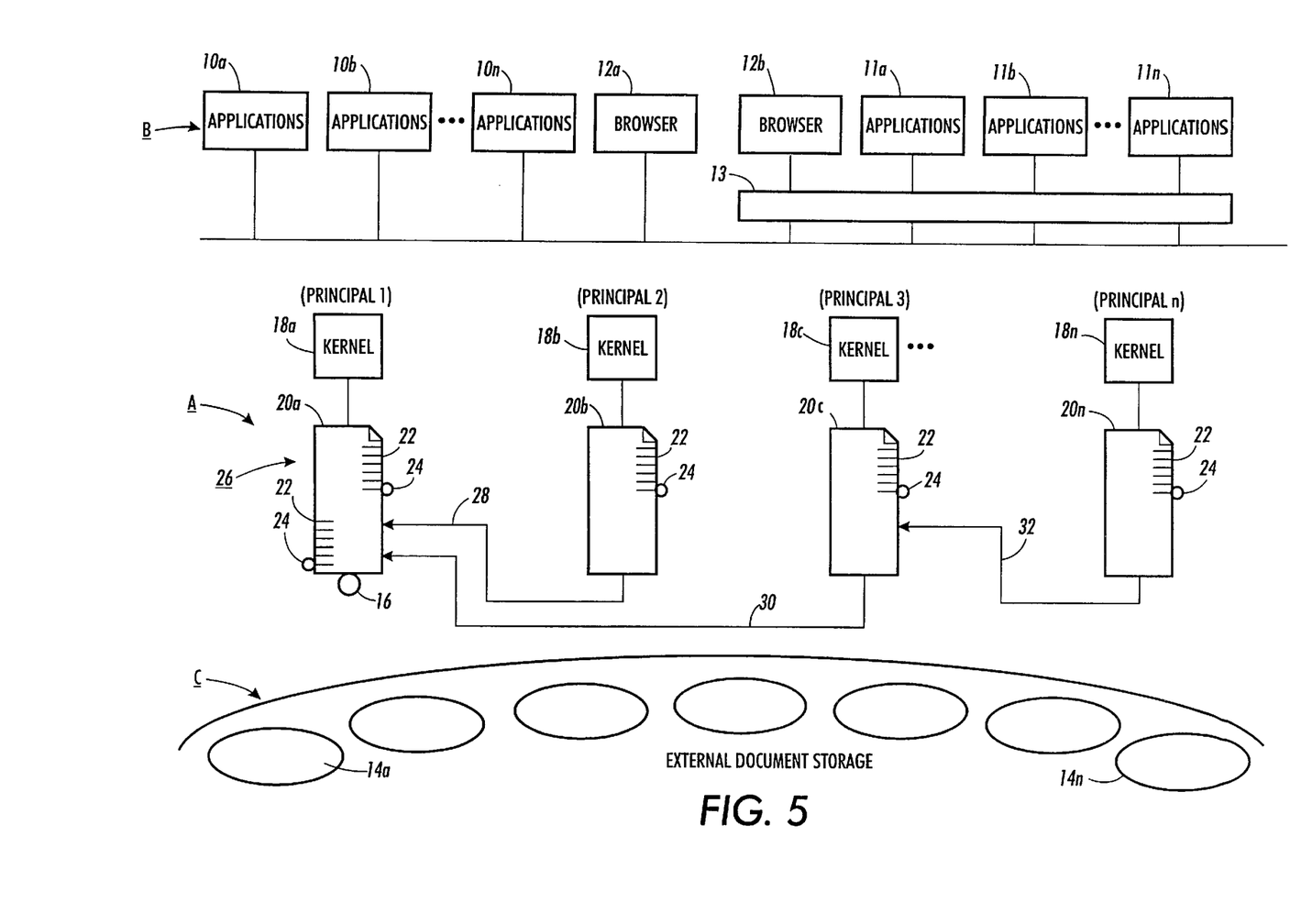
FIG. 5 is a representation of a document management system of the present invention implemented in a computer system.

FIG. 5 sets forth the architecture of a document management system (DMS) A of the present invention in greater detail. Document management system (DMS) A is shown configured for operation with front-end components B, and back-end components C. Front-end components B include applications 10a–10n and 11a–11n, such as word processing applications, and mail applications, among others. Some of the applications are considered DMS aware 10a–10n which means these applications understand DMS protocols for storing, retrieving and otherwise interacting with DMS A. Other components are considered non-DMS aware 11a–11n. Browsers 12a (DMS aware) and 12b (non-DMS aware) are considered specialized forms of applications. In order for the non-DMS aware applications 11a–11n and 12b to be able to communicate with DMS A, front-end translator 13 is provided.

Similarly, back-end components C include a plurality of repositories 14a–14n, where the content of documents are stored. Such repositories can include the hard disc of a principal's computer, a file system server, a web page, a dynamic real time data transmission source, as well as other data repositories. To retrieve data content from repositories 14a–14n, bit providers, such as bit provider 16, are used. The bit providers are provided with the capability to translate to appropriate storage protocols.

Principals 1–n each have their own kernel 18a–18n for managing documents, such as documents 20a–20n. Documents 20a–20n are considered to be documents the corresponding principal 1–n has brought into its document management space. Particularly, they are documents that a principal considers to be of value and therefore has in some manner marked as a document of the principal. The document, for example, may be a document which the principal created, it may be an e-mail sent or received by the principal, a web page found by the principal, a real-time data input such as an electronic camera forwarding a continuous stream of images, or any other form of electronic data (including video, audio, text, etc.) brought into the DMS document space. Each of the documents 20a–20n have static properties 22 and/or active properties 24 placed thereon.

Document 20a, is considered to be a base document and is referenced by reference documents 20b–20c. As will be discussed in greater detail below, in addition to base document 20a having static properties 22 and/or active properties 24, base document 20a will also carry base properties 26 which can be static properties 22 and/or active properties 24 (Static properties are shown with a - and active properties are shown with a -o).

Reference documents 20b–20c are configured to interact with base document 20a. Both base documents and reference documents can also hold static properties 22 and/or active properties 24. When principals 2,3 access base document 20a for the first time, corresponding reference documents 20b–20c are created under kernels 18b–18c, respectively. Reference documents 20b–20c store links 28 and 30 to unambiguously identify their base document 20a. In particular, in the present invention each base document is stored with a document ID which is a unique identifier for that document. When reference documents 20b–20c are created, they generate links to the specific document ID of their base document. Alternatively, if principal n references reference document 20c, reference document 20n is created with a link 32 to reference document 20c of Principal 3. By this link principal n will be able to view (i.e. its document handle) the public properties principal 3 has attached to its reference document 20c as well as the base properties and public reference properties of base document 20a. This illustrates the concept of chaining.

The above-described architecture allows for sharing and transmission of documents between principals and provides the flexibility needed for organizing documents. With continuing attention to FIG. 5, it is to be noted at this point that while links 28–30 are shown from one document to another, communication within DMS A is normally achieved by communication between kernels 18a–18n. Therefore, when DMS A communicates with either front-end components B, back-end components C, or communication occurs between principals within DMS A, this communication occurs through kernels 18a–18n. It is however, appreciated the invention will work with other communication configurations as well.

Using the described architecture, DMS A of the present invention does not require the principal to operate within a strict hierarchy such as in file or folder-type environments. Rather, properties 22,24 which are attached to documents allows a principal to search and organize documents in accordance with how the principal finds it most useful.

For instance, if principal 1 (owner of kernel 18a) creates a base document with content, and stores it within DMS A, and principal 2 (owner of kernel 18b) wishes to use that document and organize it in accordance with its own needs, principal 2 can place properties on Reference Document 20b. By placement of these properties, principal 2 can retrieve the base document in a manner different than that envisioned by principal 1.

Further, by interacting with browser 12, a principal may run a query requesting all documents having a selected property. Specifically, a user may run query language requests over existing properties.

Therefore, a point of the present invention is that DMS A manages a document space where properties are attached by different principals such that actions occur which are appropriate for a particular principal, and are not necessarily equivalent to the organizational structure of the original author of a document or even to other principals.

Another noted aspect of the present invention is that since the use of properties separates a document's inherent identity from its properties, from a principal's perspective, instead of requiring a document to reside on a single machine, documents in essence can reside on multiple machines (base document 20a can reside on all or any one of kernels 18a–18n). Further, since properties associated with a document follow the document created by a principal (for example, properties on document 20b of kernel 18b, may reference base document 20a), properties of document 20b will run on kernel 18b, even though the properties of document 20b are logically associated with base document 20a. Therefore, if a property associated with document 20b (which references base document 20a) incurs any costs due to its operation, those costs are borne by kernel 18b (i.e. principal 2), since properties are maintained with the principal who put the properties onto a document.

Intercepting Low Level Operations

Figure 6:
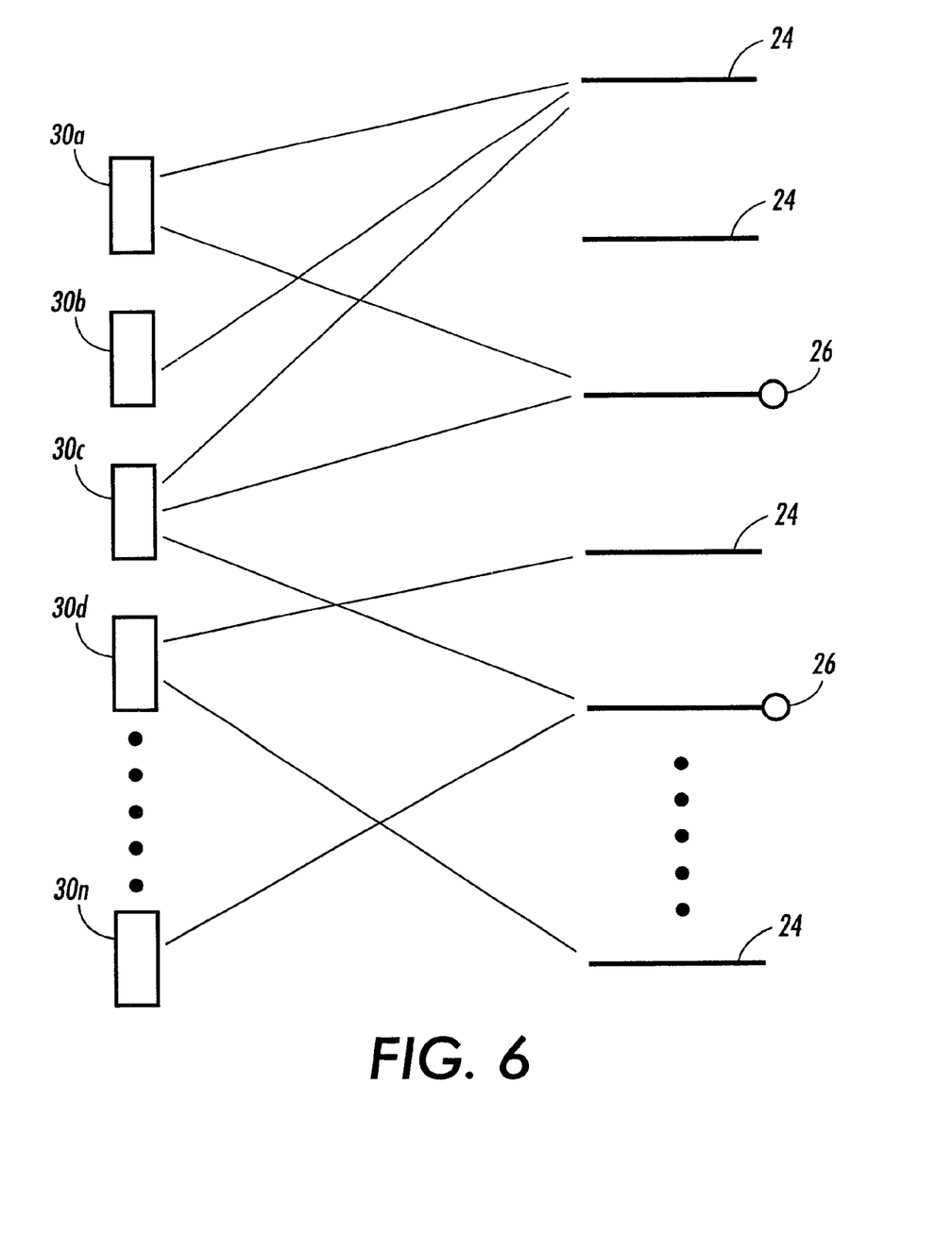
FIG. 6 illustrates the relationship between operations within a computer system and the properties of the present invention.

FIG. 6 expands upon the concept of operations acting as trigger events for initiation of properties. Computer systems have predefined operations. Among these are content read operations 30a, write operations 30b, move operations 30c, close operations 30d, and other well known defined operations. The interaction between the operations and properties such as static properties 22 and active properties 24 show that an operation can be associated with more than one property and properties in turn can be associated with more than one operation. This is accomplished by including calls to different operations when constructing a specific property. It is to be appreciated, that while operations are built into the computer system by its developer, and are considered fixed, properties may be added to the developed computer system, and are not considered fixed in the system. Therefore, properties may be added after the configuration of the computer system.

The inter-position concept of the present invention, implemented through an active property mechanism, is a way to provide behaviors such as that required by properties which affect not only the document's status but also its behavior. At the same time, active properties afford this sort of interactive control in a way that maintains the advantages of a property-based system: document-centric, meaningful to users, and controlled by the document consumer.

Active properties can be attached to documents and they contain program code which is involved in performing document operations. Active properties can register to be notified when operations take place. They can also be involved in validating those operations in the first place; or they can get involved in performing the operation. At each of these points, the active property can execute program code. Notification can be used, for example, to maintain awareness of parallel work in a collaborative system; it provides a means for a property to find out about the operations on a given document and log them or make them visible in a user interface. Verification can be used to implement mechanisms which would accept or refuse validation requests dependent upon set criteria. And a chain of properties helping to perform the operation can be used to provide facilities such as an encryption and compression as properties on documents.

The active property mechanism can interact in multiple ways to carry out its activity. These standard mechanisms of notifying, validating and performing introduced above, are expanded upon below, where the standard mechanisms it can participate in include:

- It can be consulted on attempts to add, remove, or change information on the property. This allows it to validate the property information, carry out any initialization needed to achieve its effect, and turn off such activities when it is removed.
- It can ask to intercept various operations on the content of the document. This allows it to monitor or alter the behavior of its document or other properties of its document.
- It can ask for notifications of activity in its or other document spaces. This allows it to maintain information that spans documents, such as updating conferred or inferred properties.
- API's it implements can be accessed by other entities, either inside or outside the document space. This allows it to effectively extend the basic API of its document.
- It can invoke the API's of its own or other documents or their properties. This enables behavior that involves several documents.

All active properties have three essential features: a name, a value, and active methods, and any property can be made active by giving it active methods. Using this interposition mechanism acts to extend functionality of computer system operations.

From the preceding discussion, it is to be appreciated that in existing systems, there is a strong division between different areas of responsibility. For example, an operating system will have distinct responsibilities from applications and a file system will have additionally defined, encapsulated responsibilities and capabilities. For example, applications can't normally take over operations defined as those of the file system. However, the present invention allows applications (in the form of active properties) to become involved in functionality which is normally encapsulated within an existing file system storage layer. Specifically, active properties can declare themselves interested in or have something to offer with respect to a particular performance of an operation. These active properties are coded to become invoked when a particular operation occurs.

The foregoing is intended to illustrate ways in which document sharing, collection, and arrangement can occur when the identification of documents are based on the document properties separate from the content of the documents.

In accordance with the foregoing, interaction with the document space is based on meaningful properties of documents, rather than the structure in which documents were filed. Using document properties in this manner means that interaction is more strongly connected to the user's immediate concerns and the task at hand rather than an extrinsic structure. In addition, the structure of the document space reflects changes in the state of documents, rather than simply their state when they were filed. However, collections still appear inside collections, and standard filing information —such as document ownership, modification dates, file types, etc.—are still preserved by the present system, appearing as document properties maintained by the infra-structure structure. Thus, a principal can recapture more traditional forms of structured interaction with document spaces.

The invention has been described with reference to the preferred embodiment. Obviously, modifications and alterations will occur to others upon reading and understanding this specification. It is intended to include all such modifications and alterations in so far as they come within the scope of the appended claims or the equivalents thereof

Having thus described the present invention, we now claim:

1. A document orientated, user specific method of allowing a user to enhance computational functionalities of computer system operations that are traditionally encapsulated within the computer system, outside control of the user, comprising:

initiating an operation request by the user; and intercepting the operation requests and performing user determined actions in the form of arbitrary extensible behaviors, the interception of the operation requests considered low level operations performed by an operation in the computer system, and being at least one of content read operations, write operations, move operations, and close operations.

2. The method according to claim 1 wherein the arbitrary extensible behaviors are implemented as properties.

3. The method according to claim 2 further including providing the user with access to the properties, whereby the user is given an ability to attach the properties to documents managed by the computer system.

4. The method according to claim 3 further including providing a plurality of users with an ability to initiate operation requests and to attach properties to intercept the operation requests.

5. The method according to claim 4 wherein the properties attached by the users are directed to perform an action to an element other than the document to which it is attached.

6. The method according to claim 5 wherein the properties attached to a particular document are owned by the user that attached the properties to the particular document, wherein the properties and the document with the properties attached are specific to the user.

7. The method according to claim 1 wherein the step of intercepting includes locating a mechanism within a read/write path of the computer system for the intercepting.

8. The method according to claim 2 wherein operations of the computer system are fixed upon configuration of the computer system, and properties are extensible and arbitrary and can be added to the computer system by a user after the computer system has been configured.

9. The method according to claim 2 further including attaching a property element configured to allow a user of the computer system to attach selected properties to the document during normal operation of the computer system.

10. The method according to claim 2 wherein adding the properties to individual documents, allows for granularity control in the system which is at the level of per document control.

11. A system allowing a user to enhance computational functionalities of computer system operations of a computer system, which are traditionally encapsulated within the computer system and outside control of the user, comprised of:

an operation request mechanism which generates operation requests initiated by the user; and an operation request interception mechanism configured to intercept the operation request and perform user determined actions in the form of arbitrary extensible behaviors, the interception of the operation requests considered low level operations performed in a computer system and being at least one of content read operations, write operations, move operations and close operations.

12. The system according to claim 11, wherein the arbitrary extensible behaviors are implemented as properties.

13. The system according to claim 12, wherein the user is provided with access to the properties and is given the ability to attach properties to documents managed by a computer document management system.

14. The system according to claim 13, wherein a plurality of users are provided with the ability to initiate operation requests and to attach properties to intercept the operation requests.

15. The system according to claim 14, wherein the properties attached by the users are directed to perform an action to an element other than the document to which it is attached.

16. The system according to claim 15, wherein the properties attached to a particular document are owned by the user and the document with the properties attached are specific to the user.

17. The system according to claim 11, wherein the interception includes locating the operation request interception mechanism within the read/write path of the computer system.

18. The system according to claim 12, wherein the extensible and arbitrary properties can be added to the operations of the computer system by a user after the computer system has been configured.

19. The system according to claim 12, wherein a property attachment element is configured to allow a user of the computer system to attach selected properties to the document during normal operation of the computer system.

20. The system according to claim 12, wherein the properties are added to individual documents, such that granularity control is at the level of per document control.

* * * * *